(12) United States Patent
Pertuit et al.

(10) Patent No.: US 12,550,496 B2
(45) Date of Patent: Feb. 10, 2026

(54) COATED PHOSPHOR PARTICLE, LIGHT EMITTING DEVICE INCLUDING A COATED PHOSPHOR PARTICLE, AND METHOD OF MAKING A COATED PHOSPHOR PARTICLE

(71) Applicant: CREELED, INC., Newark, CA (US)

(72) Inventors: Andre Pertuit, Raleigh, NC (US); Michael Check, Apex, NC (US); David Suich, Durham, NC (US); Colin Blakely, Raleigh, NC (US); Robert Wilcox, Rolesville, NC (US)

(73) Assignee: CREELED, INC., Newark, CA (US)

( * ) Notice: Subject to any disclaimer, the term of this patent is extended or adjusted under 35 U.S.C. 154(b) by 684 days.

(21) Appl. No.: 17/837,680

(22) Filed: Jun. 10, 2022

(65) Prior Publication Data

US 2023/0402573 A1 Dec. 14, 2023

(51) Int. Cl.
*H10H 20/851* (2025.01)
*H10H 20/01* (2025.01)
*H10H 20/854* (2025.01)
*H10H 20/855* (2025.01)

(52) U.S. Cl.
CPC ...... *H10H 20/8513* (2025.01); *H10H 20/854* (2025.01); *H10H 20/855* (2025.01); *H10H 20/0361* (2025.01)

(58) Field of Classification Search
CPC ... H10H 20/8513; H10H 20/851–8512; H10H 20/84; H10H 20/841; H10D 62/8162; C09K 11/025; C09K 11/0833; C09K 11/55; C09K 11/59; C09K 11/616; C09K 11/617
See application file for complete search history.

(56) References Cited

U.S. PATENT DOCUMENTS

| | | | |
|---|---|---|---|
| 4,568,140 A * | 2/1986 | van der Werf | C03C 17/3429 359/359 |
| 9,537,052 B2 | 1/2017 | Seibel et al. | |
| 10,608,148 B2 | 3/2020 | Gresback et al. | |
| 2009/0194781 A1* | 8/2009 | Harada | C09K 11/025 257/98 |
| 2018/0348577 A1* | 12/2018 | Pousthomis | G02F 1/133617 |

FOREIGN PATENT DOCUMENTS

TW I405836 B * 8/2013

* cited by examiner

*Primary Examiner* — Moazzam Hossain
(74) *Attorney, Agent, or Firm* — Crowell & Moring LLP

(57) ABSTRACT

A light emitting device comprises a light emitting diode (LED) chip having a dominant wavelength in a range from about 390 nm to about 560 nm, an encapsulant in optical communication with the LED chip, and coated phosphor particles dispersed in the encapsulant. Each of the coated phosphor particles comprises (a) a luminescent particle having a first refractive index at the dominant wavelength, and (b) an optical coating on the luminescent particle, where the optical coating has a second refractive index at the dominant wavelength. The second refractive index is between the first refractive index and a refractive index of the encapsulant at the dominant wavelength.

11 Claims, 7 Drawing Sheets

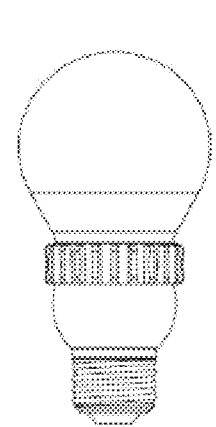
FIG. 7C
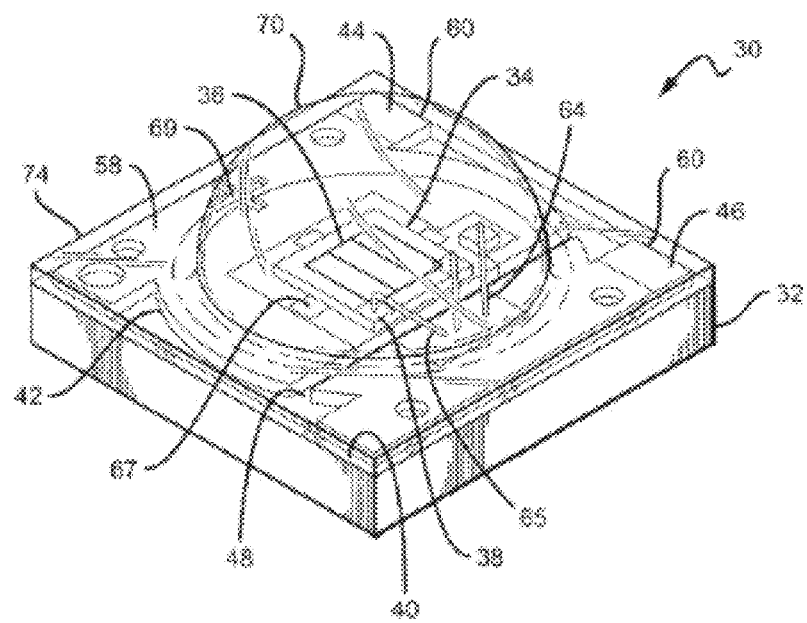
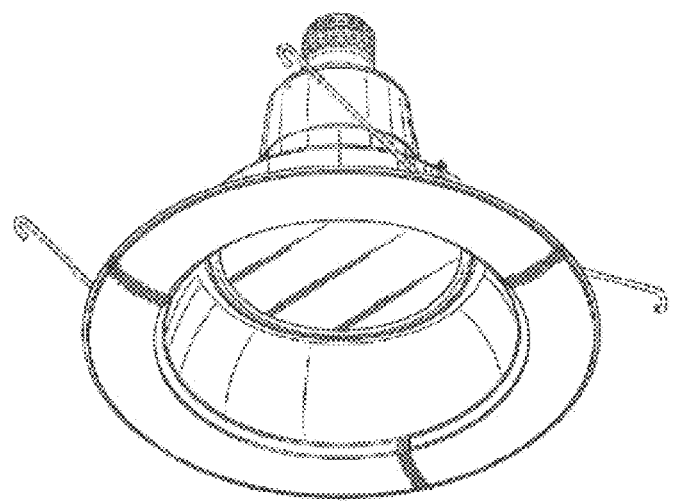
FIG. 8A
FIG. 8B

US 12,550,496 B2

COATED PHOSPHOR PARTICLE, LIGHT EMITTING DEVICE INCLUDING A COATED PHOSPHOR PARTICLE, AND METHOD OF MAKING A COATED PHOSPHOR PARTICLE

TECHNICAL FIELD

The present disclosure is related generally to light emitting diodes (LEDs) and more specifically to coated phosphors for LED applications.

BACKGROUND

Light emitting diodes (LEDs) are solid state devices that convert electric energy to light, and generally comprise one or more active layers of semiconductor material sandwiched between oppositely doped layers so as to define a p-n junction. When a bias is applied across the p-n junction, holes and electrons are injected into the active layer where they recombine to generate light in a process called injection electroluminescence. Light may be emitted from the active layer through all surfaces of the LED.

As most LEDs are nearly monochromatic light sources that appear to emit light having a single color, light emitting devices or lamps including multiple LEDs that can emit light of different colors have been employed to produce white light. In these devices, the different colors of light emitted by the individual LEDs combine to produce a desired intensity and/or color of white light. For example, by simultaneously energizing red, green and blue light emitting LEDs, the resulting combined light may appear white, or nearly white.

As an alternative to combining individual LEDs to produce light emitting devices having a particular light emission spectrum, luminescent particles, or phosphors, may be used to control the color of light emitted from LEDs. A phosphor may absorb a portion of the light emitted from an LED at a given wavelength and re-emit the light at different wavelength via the principle of photoluminescence. The conversion of light having a shorter wavelength (or higher frequency) to light having a longer wavelength (or lower frequency) may be referred to as down conversion. For example, a down-converting phosphor may be combined with a blue LED to convert some of the blue wavelengths to yellow wavelengths in order to generate white light.

Typically, luminescent particles are incorporated into a light-transmissive encapsulant that overlies an LED chip. As is the case with all interfaces involving dielectric materials of differing indexes (or indices) of refraction, there is some light lost to reflection as a photon passing through the encapsulant encounters the luminescent particle.

BRIEF SUMMARY

A coated phosphor particle comprises a luminescent particle having a first refractive index at a predetermined wavelength, and an optical coating on the luminescent particle, where the optical coating has a second refractive index at the predetermined wavelength. The second refractive index is between the first refractive index and a refractive index of an encapsulant at the predetermined wavelength.

A light emitting device comprises a light emitting diode (LED) chip having a dominant wavelength in a range from about 390 nm to about 560 nm, an encapsulant in optical communication with the LED chip, and coated phosphor particles dispersed in the encapsulant. Each of the coated phosphor particles comprises (a) a luminescent particle having a first refractive index at the dominant wavelength, and (b) an optical coating on the luminescent particle, where the optical coating has a second refractive index at the dominant wavelength. The second refractive index is between the first refractive index and a refractive index of the encapsulant at the dominant wavelength.

A method of making a coated phosphor particle comprises: forming an optical coating on a luminescent particle via a sol-gel reaction, or forming a phosphor-in-glass (PiG) wafer or plate, and grinding the PiG wafer or plate.

BRIEF DESCRIPTION OF THE DRAWINGS

FIGS. 7A-7C show exemplary packaging configurations for a light emitting device including an LED chip and an encapsulant with embedded coated phosphor particles.

FIGS. 8A-8E show exemplary light fixtures that may utilize the light emitting devices and coated phosphor particles described in this disclosure.

DETAILED DESCRIPTION

Definitions

Figure 1A:
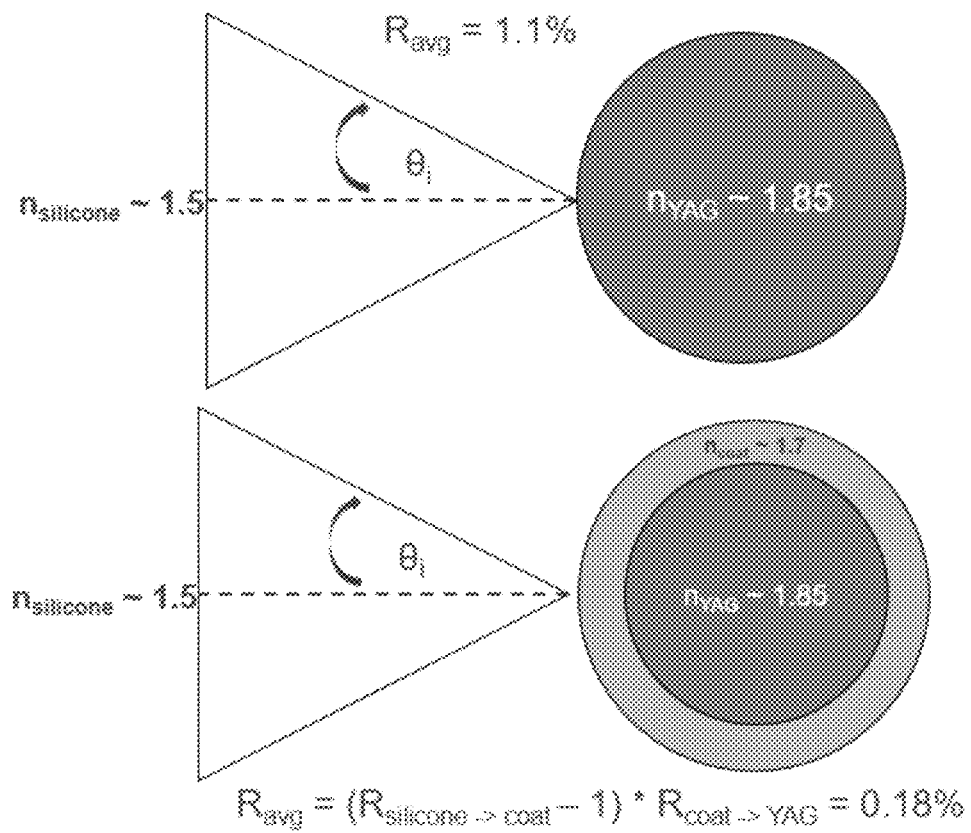
FIG. 1A is a schematic providing a comparison of average reflection ($R_{avg}$) from an uncoated phosphor particle (top) and an exemplary coated phosphor particle (bottom) dispersed in an encapsulant (e.g., silicone).

An "activator" of a phosphor comprising a host crystal may be understood to be a doping agent, or "dopant," in the host crystal. For example, a rare earth element such as cerium may function as a dopant or activator for a host crystal comprising yttrium aluminum garnet ($Y_3Al_5O_{12}$). The activator may be utilized to obtain certain luminescence properties from the phosphor.

A first device that is described as being "in optical communication with" a second device may be understood to be positioned such that light from the first device reaches the second device, or vice versa.

"Dominant wavelength" refers to the wavelength of light that has the same apparent color as the light emitted from an LED, as perceived by the human eye. The dominant wavelength differs from peak wavelength in that the dominant wavelength takes into account the sensitivity of the human eye to different wavelengths of light.

It is understood that when an element such as a layer, region, or substrate is referred to as being "on" another element, it can be directly on the other element or intervening elements may also be present. Furthermore, relative terms such as "inner," "outer," "upper," "above," "over," "overlying," "beneath," "below," "top," "bottom," and similar terms, may be used herein to describe a relationship between elements. It is understood that these terms are intended to encompass orientations of the device that differ from those depicted in the figures.

Although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The figures are intended as schematic illustrations. As such, the actual dimensions and shapes of the devices and components (e.g., layer thicknesses) can be different, and departures from the illustrations as a result of, for example, manufacturing techniques and/or tolerances may be expected. Embodiments should not be construed as limited to the particular shapes of the regions illustrated herein but are to include deviations in shapes that result from, for example, manufacturing. A region illustrated or described as square or rectangular may have rounded or curved features due to normal manufacturing tolerances. Thus, the regions illustrated in the figures are schematic in nature and their shapes are not intended to illustrate the precise shape of a region of a device and are not intended to limit the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. The terms "elements" and "a plurality of elements" may be understood to refer to "more than one element," where "element" may be replaced with any noun. It may be further understood that the terms "comprises" "comprising," "includes" and/or "including" specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

This disclosure describes a coated phosphor particle with a coating system designed to increase light transmission into the underlying luminescent particle. This greater light transmission may drive more efficient light conversion overall, thereby increasing the performance of the coated phosphor particle and allowing for reduced luminescent particle usage (e.g., reduced loading levels in the encapsulant).

As indicated above, there is some light lost to reflection as a photon passing through an encapsulant encounters a luminescent (or lumiphore) particle. This reflection affects both polarizations of light differently and the reflections at different incident angles for both polarizations (s and p) can be calculated using Fresnel's equations, where R is the reflectance:

$$r_s = \frac{n_1\cos\theta_1 - n_2\cos\theta_2}{n_1\cos\theta_1 + n_2\cos\theta_2}$$

$$t_s = \frac{2n_1\cos\theta_1}{n_1\cos\theta_1 + n_2\cos\theta_2}$$

$$r_p = \frac{n_1\cos\theta_2 - n_2\cos\theta_1}{n_1\cos\theta_2 + n_2\cos\theta_1}$$

$$t_p = \frac{2n_1\cos\theta_1}{n_1\cos\theta_2 + n_2\cos\theta_1}$$

$$R = \frac{|r_s|^2 + |r_p|^2}{2} \quad T = 1 - R$$

To obtain maximum transmission into the luminescent particle, the index differences between the transmission medium (the encapsulant, which may be silicone) and the luminescent particle may be minimized. This approach can be implemented by designing an optical coating to function as an intermediate index material between the encapsulant and the underlying luminescent particle. By doing this, when a light wave enters the coated phosphor particle, reflection can be reduced, as illustrated in the schematic of FIG. 1A, where the average reflection ($R_{avg}$) from an uncoated phosphor particle (top) and an exemplary coated phosphor particle (bottom) are compared. Surface modification of the luminescent particle as described herein may also reduce trap states and non-radiative mechanisms, thereby influencing the brightness of the emission.

Figure 1B:
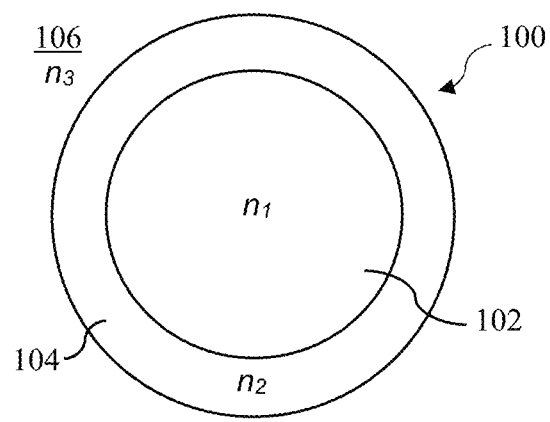
FIG. 1B is a schematic of an exemplary coated phosphor particle surrounded by an encapsulant.

Referring to FIG. 1B, the coated phosphor particle 100 includes (a) a luminescent particle 102 having a first refractive index $n_1$ at a predetermined wavelength, and (b) an optical coating 104 on the luminescent particle 102, where the optical coating 104 has a second refractive index $n_2$ at the predetermined wavelength. The second refractive index $n_2$ is selected to lie between the first refractive index $n_1$ and a refractive index $n_3$ of an encapsulant (e.g., silicone) 106 at the predetermined wavelength. Since the refractive index of a material may vary as function of wavelength of the incident light, it is beneficial to specify the wavelength or range of wavelengths of interest (what is referred to above as the "the predetermined wavelength"). Typically, the predetermined wavelength refers to the wavelength or range of wavelengths employed to excite the coated phosphor particles. More specifically, the predetermined wavelength may refer to the dominant wavelength of a LED chip in optical communication with the coated phosphor particle 100. In some examples, the dominant wavelength may lie in a range from about 390 nm to about 560 nm, and/or from about 420 nm to about 490 nm. Typically, the LED chip emits blue, violet and/or cyan light, and the coated phosphor particle 100 may function to down-convert the light (e.g., for white light emission).

The encapsulant 106 may be understood to be a light-transmissive polymeric material which may encapsulate the phosphor particles and provide mechanical and/or environmental protection for a light emitting diode (LED) chip. The refractive index $n_3$ of the encapsulant, which may be silicone, may be in a range from 1.4 to less than 1.6 at the predetermined wavelength. The first refractive index $n_1$, which corresponds to the luminescent particle 102, is typically in a range from greater than 1.8 to about 1.9 at the predetermined wavelength. The second refractive index $n_2$, which corresponds to the optical coating 104, may thus be in a range from 1.5 to 1.8 or from 1.6 to 1.8 at the predetermined wavelength, in this example.

Using this coating strategy, reflection may be significantly reduced, as illustrated in FIG. 1A; while an uncoated phosphor particle (yttrium aluminum garnet (YAG) in this example) exhibits an average reflection $R_{avg}$ of 1.1%, the coated phosphor particle (YAG with an optical coating having a refractive index of 1.7, which lies between the refractive index of YAG (1.85) and that of silicone (about 1.5)) exhibits an average reflection $R_{avg}$ of 0.18%.

The luminescent particle 102 may emit yellow, green, red or another color of light, and may be utilized with the LED chip for generation of white light. For example, the luminescent particle 102 may emit yellow light with a peak emission wavelength in a range from 575 nm to 600 nm, and thus may be described as a yellow phosphor (e.g., yttrium aluminum garnet (YAG)). The yellow light emitted may have a full-width-at-half-maximum (FWHM) of less than 60 nm, in which case the luminescent particle 102 may be considered to be a narrow-band yellow phosphor. In another example, the luminescent particle 102 may emit green light with a peak emission wavelength in a range from 498 nm to 550 nm, and thus may be described as a green phosphor (e.g., lutetium aluminum garnet (LuAG)). The green light emitted may have a FWHM of less than 60 nm, in which case the luminescent particle 102 may be considered to be a narrow-band green phosphor. In yet another example, the luminescent particle 102 may emit red light with a peak emission wavelength in a range from 610 nm to 660 nm, and thus may be described as a red phosphor (e.g., $CaAlSiN_3$). The red light emitted may have a FWHM of less than 45 nm, in which case the luminescent particle 102 may be considered to be a narrow-band red phosphor. It is noted that the luminescent particle 102 includes a host lattice (e.g., the YAG, LuAG, or $CaAlSiN_3$ referred to above), and the host lattice includes a suitable activator or dopant (e.g., europium or cerium) to enhance light emission from the luminescent particle 102. Typically, the luminescent particle has a linear size (e.g., width or diameter) in a range from about 1 micron to about 100 microns.

The optical coating 104 may comprise a glass. In other words, the optical coating may include one or more chemical compounds having a glassy or amorphous structure, as opposed to a crystalline structure. The optical coating 104 may include one or more oxides, where "oxide" is understood to refer to a chemical compound including oxygen and at least one other element. Accordingly, the oxide may be a single component oxide, such as $SiO_2$, or a multicomponent oxide, such as $LaTiO_3$. The oxide may comprise, in some examples, a silicate including $SiO_2$ and another oxide compound, such as, in the example of an aluminum silicate, $Al_2O_3$. The one or more oxides, which may comprise one or more glasses, may be selected from the following exemplary oxide compounds: $M_2O$, where M comprises one or more alkali metal cations, M being Li, Na, K, Rb, Cs, and/or Fr; NO, where N comprises one or more alkaline earth metal cations, N being Be, Mg, Ca, Sr, Ba, and/or Ra; and $L_2O_3$, where L comprises one or more lanthanide metal cations, L being La, Ce, Pr, Nd, Pm, Sm, Eu, Gd, Tb, Dy, Ho, Er, Tm, Yb and/or Lu. Also or alternatively, the one or more oxides may comprise $B_2O_3$, $SiO_2$, $Al_2O_3$, BaO, $TiO_2$, ZnO, $ZrO_2$, $CeO_2$, EuO, PbO and/or YbO.

Importantly, the optical coating 104 is engineered to have a refractive index (the "second refractive index $n_2$" referred to above) that lies between the first refractive index $n_1$, corresponding to the luminescent particle 102, and the refractive index $n_3$ of the encapsulant to be used, which is typically silicone. Table 1 proposes compositions for the optical coating 104 depending on the desired value of the second refractive index $n_2$. It is noted that small amounts of other additives (less than 5%) may also be used to impart favorable properties to the optical coating 104.

TABLE 1

Optical Coating Compositions Depending on Desired Refractive Index

| Index Range | Material | Wt. (%) |
|---|---|---|
| 1.5-1.6 | $M_2O$ | 0-50 |
| | NO | 0-50 |
| | $B_2O_3$ | 0-50 |
| | $SiO_2$ | 0-100 |
| | $Al_2O_3$ | 0-80 |
| | BaO | 0-80 |
| | ZnO | 0-50 |
| | $CeO_2$ | 0-50 |
| | EuO | 0-50 |
| | YbO | 0-50 |
| 1.6-1.7 | $M_2O$ | 0-50 |
| | NO | 0-50 |
| | $B_2O_3$ | 0-50 |
| | $SiO_2$ | 0-100 |
| | $Al_2O_3$ | 0-80 |
| | BaO | 0-80 |
| | ZnO | 0-50 |
| | $TiO_2$ | 0-50 |
| | PbO | 0-80 |
| | $CeO_2$ | 0-50 |
| | EuO | 0-50 |
| | YbO | 0-50 |
| 1.7-1.8 | $M_2O$ | 0-50 |
| | NO | 0-50 |
| | $L_2O_3$ | 0-80 |
| | $SiO_2$ | 0-100 |
| | $Al_2O_3$ | 0-80 |
| | $B_2O_3$ | 0-50 |
| | ZnO | 0-50 |
| | $TiO_2$ | 0-50 |
| | PbO | 0-90 |
| | BaO | 0-80 |
| | $ZrO_2$ | 0-50 |
| | $CeO_2$ | 0-50 |
| | EuO | 0-50 |
| | YbO | 0-50 |
| 1.8+ | $M_2O$ | 0-50 |
| | NO | 0-50 |
| | $L_2O_3$ | 0-80 |
| | $SiO_2$ | 0-100 |
| | $Al_2O_3$ | 0-80 |
| | $B_2O_3$ | 0-50 |
| | ZnO | 0-50 |
| | $TiO_2$ | 0-50 |
| | PbO | 0-100 |
| | BaO | 0-80 |
| | $ZrO_2$ | 0-50 |
| | $CeO_2$ | 0-50 |
| | EuO | 0-50 |
| | YbO | 0-50 |

The optical coating 104 may have a thickness in a range from 10 nm to 10 micron, and is more typically in a range from about 100 nm to about 1 micron, or from about 700 nm to about 1 micron. It is recognized that changing the thickness of the optical coating 104 may allow for further control over the refractive index $n_2$ of the optical coating 104. The thickness of the optical coating 104 may be uniform about the circumference of the luminescent particle 102, where the modifier "uniform" means the thickness exhibits a variation of less than ±10%, or less than ±5%, about the circumference. Preferably, the optical coating 104 completely surrounds the luminescent particle 102. In other examples, the coating may be discontinuous and/or nonuniform in thickness. In some embodiments, more than one luminescent particle 102 may be encapsulated within the optical coating 104.

The optical coating 104 may be engineered such that the second refractive index $n_2$ is substantially constant through the thickness of the optical coating 104. Alternatively, the second refractive index $n_2$ may vary through the thickness of the optical coating 104; in other words, the second refractive index $n_2$ may comprise a gradient and may be described as a graded refractive index. Since the refractive index of the luminescent particle 102 (the first refractive index $n_1$) typically lies above that of the encapsulant 106, the graded refractive index of the optical coating 104 may decrease through the thickness of the optical coating 104 in a direction away from the luminescent particle 102. Alternatively, in an example where the first refractive index $n_1$ is less than that of the encapsulant, the graded refractive index may increase through the thickness of the optical coating 104 in a direction away from the luminescent particle 102.

Figure 2:
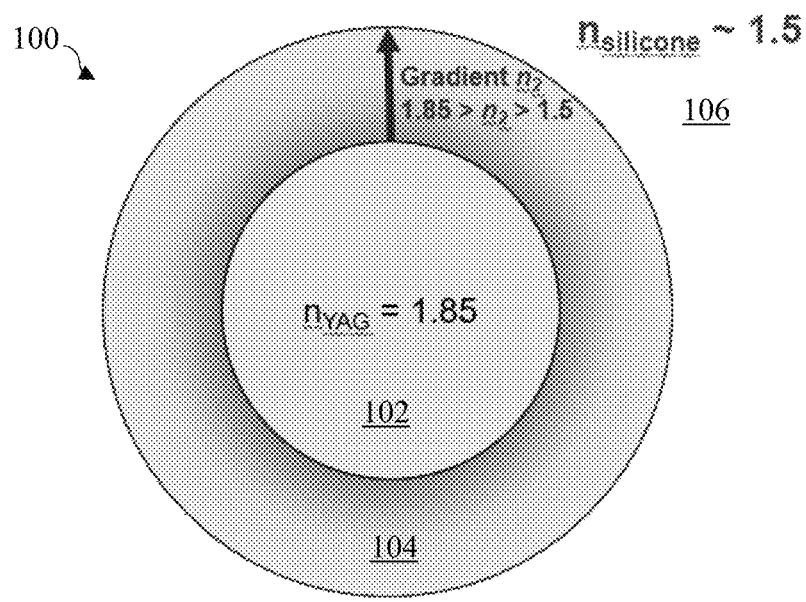
FIG. 2 is a schematic of an exemplary coated phosphor particle including an optical coating having a graded refractive index.

In the example of FIG. 2, the luminescent particle 102 comprises YAG and the first refractive index $n_1$ is 1.85, the encapsulant is silicone, which has a refractive index of about 1.5, and the optical coating 104 has a second refractive index $n_2$ which lies between 1.85 and 1.5 and exhibits a decreasing gradient through the thickness of the optical coating 102. The second refractive index $n_2$ may exhibit a continuous gradient (e.g., a linear or exponential increase or decrease) or a step-function gradient.

Figure 3:
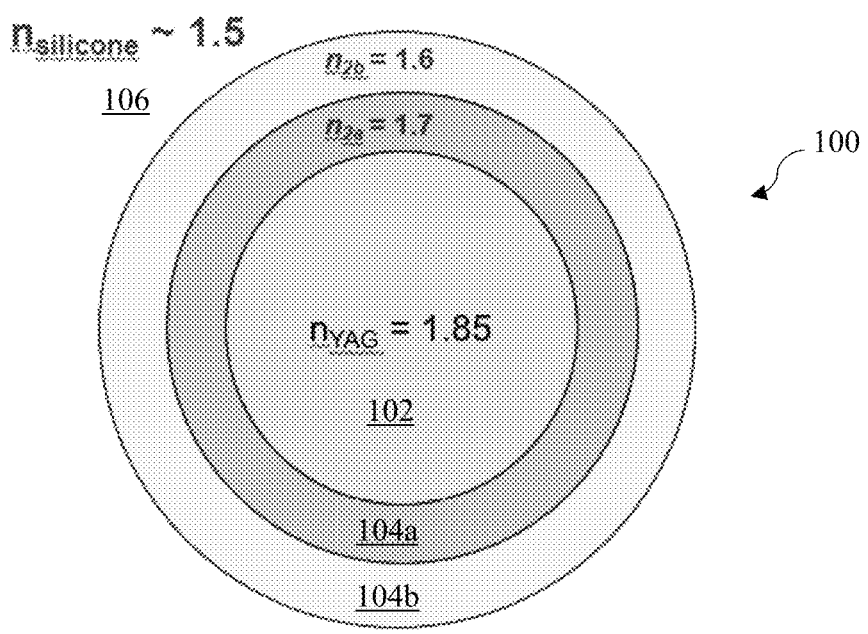
FIG. 3 is schematic of an exemplary coated phosphor particle including two optical coatings each having a different refractive index.

In some examples, the optical coating 104 may be one of a number of (a plurality of) optical coatings 104 on the luminescent particle 102, where each 104$m$ of the optical coatings 104 has a second refractive index $n_{2m}$ between the first refractive index $n_1$ and the refractive index $n_3$ of silicone, and where some or all of the optical coatings 104 have different second refractive indices from each other. For example, the optical coatings 104 may include successively lower (or higher) second refractive indexes in a direction away from the luminescent particle 102, depending on whether the refractive index of the luminescent particle 102 ("the first refractive index $n_1$") is greater than or less than that of the encapsulant 106. Accordingly, the optical coatings 104 may be arranged such that the second refractive indexes exhibit a step-function gradient. In the example of FIG. 3, the luminescent particle 102 comprises YAG and the first refractive index $n_1$ is 1.85, the encapsulant is silicone, which has a refractive index of about 1.5, and each of the optical coatings 104$a$,104$b$ has a second refractive index $n_{2a}$, $n_{2b}$ which lies between 1.85 and 1.5. In addition, the second refractive index $n_{2b}$ is less than the second refractive index $n_{2a}$. Although the example here shows two optical coatings 104$a$,104$b$, it is understood that there may be a large number of the optical coatings 104 on the luminescent particle 102, such as at least two or at least four of the optical coatings 104, and/or up to 10 or up to 15 of the optical coatings 104.

Figures 4A, 4B, 4C:
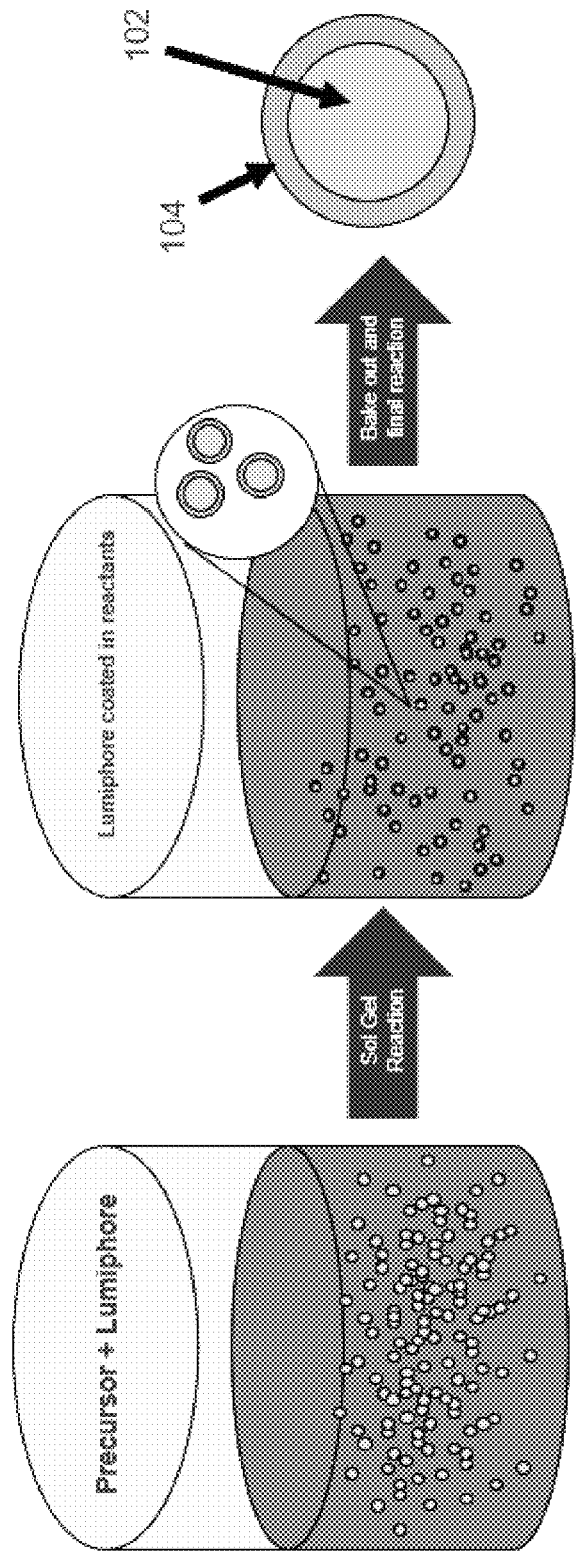
FIGS. 4A-4C illustrate a sol-gel method of fabricating the coated phosphor particles.

A method of making a coated phosphor particle is also described in this disclosure. The optical coating may be formed via a sol-gel reaction, or by formation of a phosphor-in-glass (PiG) wafer followed by grinding to form the coated phosphor particles. In the former case, one or more suitable precursors for the optical coating 104 may be mixed with the luminescent particles 102 to form a reaction mixture, as illustrated in FIG. 4A, and a sol-gel reaction may ensue, leading to formation or deposition of a sol-gel coating on the luminescent particles 102, as illustrated in FIG. 4B. After the sol-gel reaction, the particles may undergo drying and/or a heat treatment to form the optical coating 104 on the luminescent particles 102, as shown in FIG. 4C. In addition to the coating precursor and the luminescent particles, the reaction mixture shown in FIG. 4A may include a solvent, water, and/or a catalyst. Suitable precursors and reaction mixture components to form glass or oxide coatings having the compositions shown in Table 1 using sol-gel methods are known in the art. The thickness of the optical coating 104 may lie within any of the ranges provided above. Typically, sol-gel approaches lead to coatings of uniform thickness.

Figure 5:
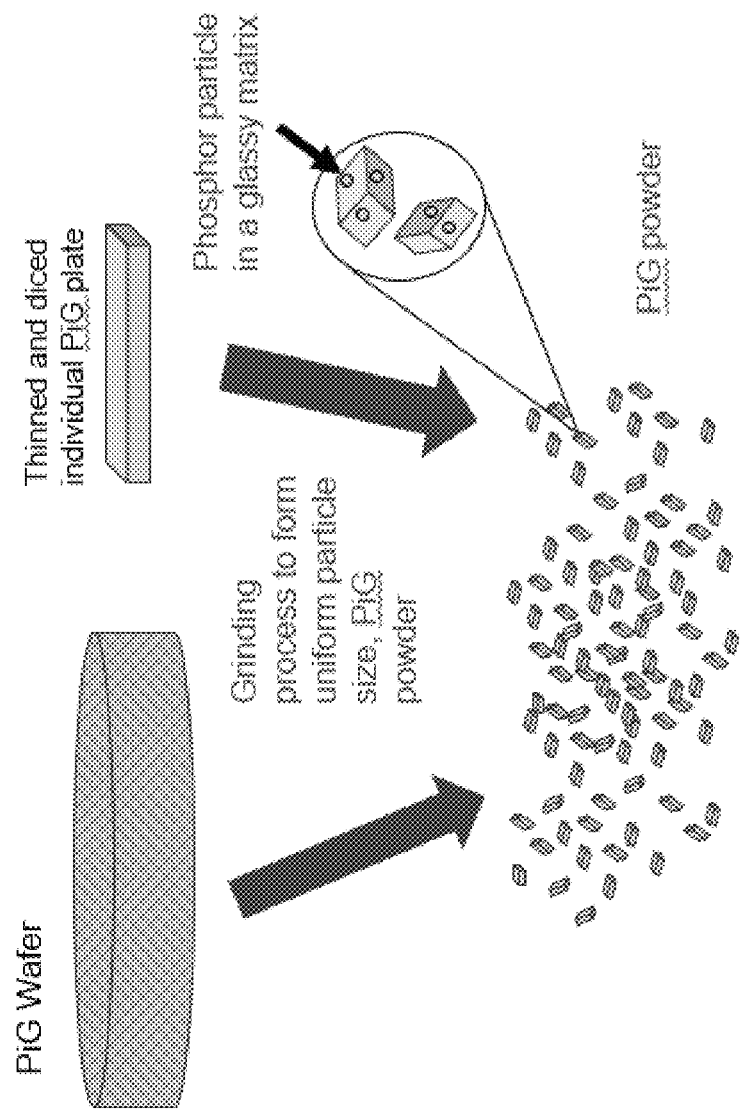
FIG. 5 illustrates a phosphor-in-glass method of fabricating the coated phosphor particles.

Using the PiG approach, the PiG wafer may be fabricated to have a glass matrix of the composition desired for the optical coating with the luminescent particles dispersed therein. In some examples, the wafer may be thinned and diced to form individual PiG plates. Referring to FIG. 5, upon grinding of the wafer and/or plates, coated phosphor particles ("PiG powder"), each comprising one or more luminescent particles 102 surrounded by the optical coating 104, may be formed. The thickness of the optical coating 104 formed in this manner may lie within any of the ranges provided above. Typically, PiG approaches lead to coatings of nonuniform thickness.

Figure 6:
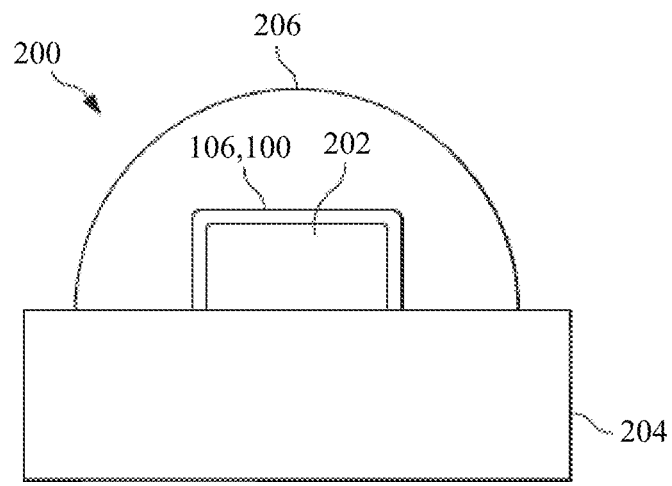
FIG. 6 is a schematic of an exemplary light emitting device comprising a LED chip in optical communication with the coated phosphor particles.

Referring to FIG. 6, a light emitting device 200 including the coated phosphor particles 100 described above is illustrated. The light emitting device 200 includes a light emitting diode (LED) chip 202 having a dominant wavelength in a range from about 390 nm to about 560 nm, or from about 420 nm to about 490 nm, and an encapsulant 106 in optical communication with (e.g., coated on) the LED chip 202, where the encapsulant 106 typically comprises an optically transmissive material such as silicone. Coated phosphor particles 100 are dispersed and/or embedded in the encapsulant 106 and are also in optical communication with the LED chip 202, which in some examples may be a blue LED chip 202. Each of the coated phosphor particles 100 includes, as shown in FIG. 1, (a) a luminescent particle 102 having a first refractive index at the dominant wavelength and (b) an optical coating 104 on the luminescent particle 102, where the optical coating 104 has a second refractive index at the dominant wavelength; the second refractive index lies between the first refractive index and the refractive index of the encapsulant. The LED chip 202 may have a flip-chip structure or a vertical chip structure. The coated phosphor particles 100 may have any of the characteristics or properties described above or elsewhere in this disclosure. The LED chip 202 may be disposed on a submount (substrate) 204 and a lens 206 may overlie the LED chip 202, although other submount or package configurations are possible, as described below.

The encapsulant 106 may include more than one type of the coated phosphor particles 100. More specifically, the coated phosphor particles 100 may comprise more than one type of luminescent particle 102 and/or more than one type of optical coating 104. In other words, some or all of the luminescent particles 102 may have different host lattices; also or alternatively, some or all of the optical coatings 104 may have different compositions. For example, the luminescent particles 102 dispersed in the encapsulant 106 may include yellow, green and/or red phosphors, e.g., one or more of YAG, LuAG, and/or CaAlSiN$_3$ particles. In another example, the composition of the optical coating 104 deposited on a YAG particle 102 may be different from that deposited on a CaAlSiN$_3$ particle 102, given the differences in the refractive indexes of different types of luminescent particles 102.

The coated phosphor particles 100 may be employed in any of a number of configurations. For example, the encapsulant 106 coated on the LED chip 202 may include the coated phosphor particles 100, as illustrated in FIG. 6. Alternatively, the lens 206 overlying the LED chip 202 may include the coated phosphor particles 100. For example, the coated phosphor particles 100 may be applied on an inner or outer surface of the lens 206. In another example, a substrate disposed remote from the LED chip may include the coated phosphor particles 100. More than one type of LED chip (blue and/or other colors) 202 as well as additional phosphors and/or luminescent semiconducting nanoparticles (quantum dots) may be employed in the light emitting device 200.

The light emitting device 200 may have any of a number of different packaging configurations. As is well known in the art, in order to use an LED chip in a circuit or other like arrangement, it is known to enclose the LED chip in a package to provide environmental and/or mechanical protection, color selection, light focusing and the like. An LED package may also include electrical leads, contacts or traces for electrically connecting the LED package to an external circuit.

Figure 7A:
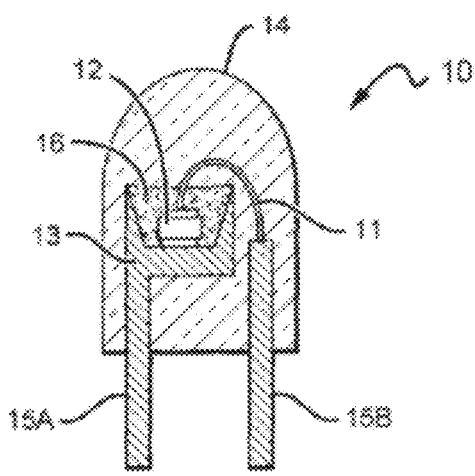

A typical LED package 10 is illustrated in FIG. 7A. In this example, a single LED chip 12 is mounted on a reflective cup 13 by means of a solder bond or conductive epoxy. One or more wire bonds 11 connect the contacts of the LED chip 12 to leads 15A and/or 15B, which may be attached to or integral with the reflective cup 13. The reflective cup may be filled with an encapsulant 16 which may include the coated phosphor particles 100. The entire assembly may be encapsulated in a protective resin 14, which may be molded in the shape of a lens to collimate the light emitted from the LED chip 12.

Figure 7B:
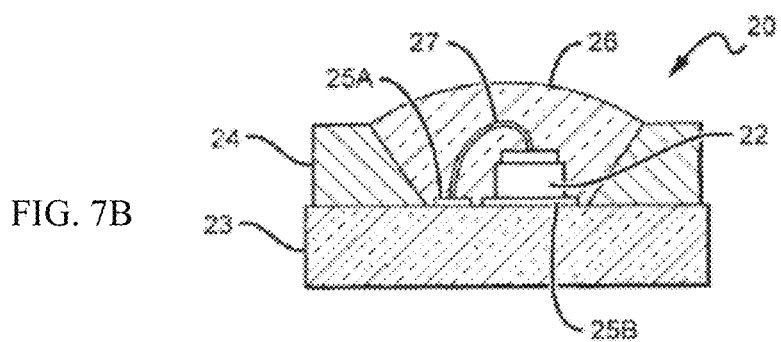

Another conventional LED package 20 is illustrated in FIG. 7B and includes one or more LED chips 22 mounted onto a carrier, such as a printed circuit board (PCB) carrier, as well as leads and a substrate or submount. In this embodiment, a reflector 24 mounted on a submount 23 surrounds the LED chip(s) 22 and reflects light emitted by the LED chip(s) 22 away from the package 20. The reflector 24 also provides mechanical protection to the LED chips 22. One or more wirebond connections 27 may be made between contacts on the LED chips 22 and electrical traces 25A, 25B on the submount 23. The mounted LED chips 22 are then covered with an encapsulant 26, such as a silicone, which may provide environmental and mechanical protection to the chips while also acting as a lens. As described above, the encapsulant 26 may contain the coated phosphor particles 100. Other exemplary LEDs comprise LED packages formed of a plastic material that is molded about a lead frame, and the LED chip(s) is mounted in a cavity of the package, and an optically transmissive encapsulant, such as silicone, is dispensed into the cavity over the LED chip(s). Again, the coated phosphor particles 100 described in this disclosure can be dispersed in the encapsulant.

Another exemplary LED package 30 is shown in FIG. 7C and comprises an LED chip 34 on a submount 32 with a molded lens 70, such as a silicone lens, formed over it. The lens 70 can include phosphors, such as the coated phosphor particles 100 described herein, dispersed therein and/or on the LED chip 34. The LED chip 34 can also or alternatively be coated by an encapsulant with the coated phosphor particles 100 embedded therein. The lens can be molded in different shapes, such as hemispherical, planar, chopped or other shapes. An example of such LEDs is described in U.S. Pat. Nos. 9,070,850 and 9,048,396, which are hereby incorporated by reference. It is noted that other reference numbers shown in FIG. 7C are defined in U.S. Pat. No. 9,070,850. Alternative light emitting device designs that include multiple LEDs mounted within a cavity and covered with an encapsulant with phosphor particles dispersed therein are described in U.S. Pat. No. 8,624,271, which is hereby incorporated by reference.

LED chips generally comprise one or more active layers of semiconductor material sandwiched between oppositely doped layers. When a bias is applied across the doped layers, holes and electrons are injected into the active layer where they recombine to generate light. Light is emitted from the active layer and from various surfaces of the LED. Light is emitted by the LED chip at a primary wavelength. The primary radiation may be absorbed by the phosphor or wavelength conversion material (e.g., the coated phosphor particles 100), which responsively emits light at secondary wavelength(s). The primary and/or secondary wavelengths of light can mix to produce a desired color of light. As would be understood by one of skill in the art, depending on the primary wavelength(s) and the amount of loading of the phosphor(s), as well as their light absorption/emission characteristics, various color temperatures of white light can be produced by the LED chips.

The LED chips shown schematically in FIGS. 6 and 7A-7C may be group III nitride-based LED chips whose active region is formed from nitrogen and group III elements such as aluminum, gallium and/or indium in the form of nitride layers epitaxially grown and doped, as would be understood by one of ordinary skill in the art, to produce light in the green to UV spectral ranges, for example blue light. As illustrated in the preceding examples, the coated phosphor particles 100 may be incorporated into silicone or another optically transparent encapsulant material and coated onto the LED chip. In other embodiments, the coated phosphor particles 100 can be placed in and/or on an encapsulant and/or optic of the LED chip, such as silicone, epoxy or glass. As described above, the coated phosphor particles 100 may include different types of luminescent particles, e.g., red nitride phosphors and/or green or yellow LuAG or YAG phosphors, and/or different types of optical coatings. The coated phosphor particles 100 can be mixed together in the encapsulant and/or positioned separately (e.g., in a remote phosphor configuration) on the optic and/or in discrete layers on the LED chip. The result may be a light emitting device that emits warm white light (e.g., 2700K to 4000K) and/or comprises a high CRI (e.g., greater than 90) and/or has an increased gamut.

The LED components, packages and light emitting devices described above may be fabricated using methods known in the art, as described for example in U.S. Patent Application Publication No. 2012/0280261, entitled "Light Emitting Diode (LED) for Achieving an Asymmetric Light Output," which is hereby incorporated by reference. In addition, the LED chips may be coated with the aforementioned coated phosphor particles 100 using any suitable method known in the art, such as the methods described in U.S. Patent Application Publication Nos. 2008/0179611 and 2008/0173884, both of which are entitled "Wafer Level Phosphor Coating Method and Devices Fabricated Utilizing Method," and hereby incorporated by reference. As set forth in these patent publications, LED chips can be coated and/or sprayed by phosphors such as the coated phosphor particles 100 described herein. The LED chips may also or alternatively be coated using electrophoretic deposition (EPD), such as with the EPD method described in U.S. Pat. No. 8,563,339 to Tarsa et al., entitled "Closed Loop Electrophoretic Deposition of Semiconductor Devices," which is hereby incorporated by reference.

Figure 8C:
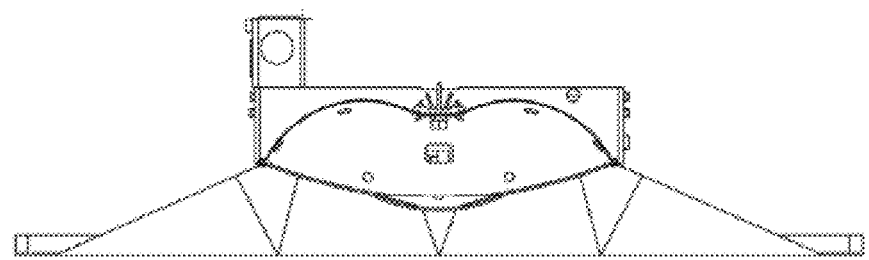
Figure 8D:
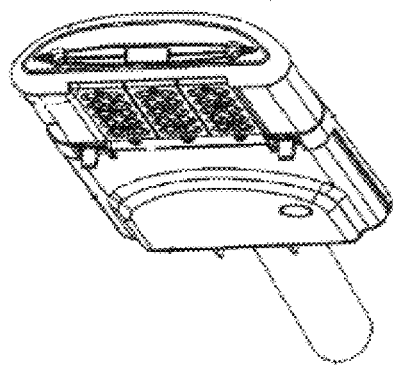
Figure 8E:
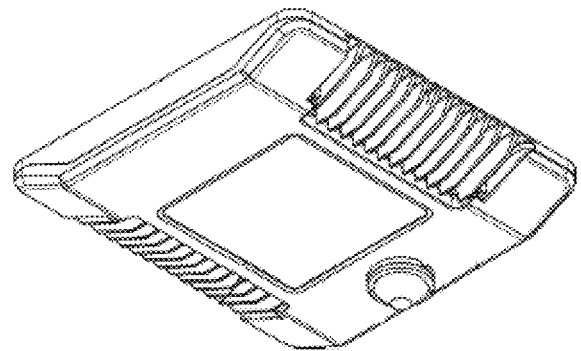

The light emitting devices comprising the coated phosphor particles 100 described herein may have particular utility with respect to various form factor light fixtures. For example, each of the embodiments disclosed herein may be alternatively implemented in various types of solid-state light fixtures including, for example, downlights, troffers, street lights, canopy lights, parking garage lights, lights that use waveguide technology and other lighting fixtures. FIG. 8A illustrates an omnidirectional light bulb, such as an A19 bulb. Other similar consumer lights, such as PAR, BR and candelabra bulbs, can also implement the light emitting devices described herein. Exemplary lights are described in U.S. Pat. Nos. 8,591,062 and 8,596,819 and U.S. Patent Publication No. 2015/0362168, each of which is hereby incorporated by reference. FIG. 8B shows another downlight that can incorporate light emitting devices described herein. An example of such a downlight is disclosed in U.S. Pat. No. 8,777,449, which is hereby incorporated by reference. FIG. 8C illustrates a troffer light fixture that can incorporate the light emitting devices described herein. An exemplary troffer light fixture is disclosed in U.S. Published Patent Publication No. 2012/0327650, which is hereby incorporated by reference. In another example, FIG. 8D illustrates a solid-state street light that may include the light emitting devices described herein. Other street lights and outdoor lighting fixtures that can be implemented using the light-emitting devices described herein include the lights disclosed in U.S. Pat. Nos. 8,622,584; 8,425,071; 9,028,087; and U.S. Patent Publication No. 2015/0253488, each of which is hereby incorporated by reference. Finally, FIG. 8E illustrates a canopy light which is described in U.S. Pat. No. 9,182,096, which is hereby incorporated by reference. Light emitting devices described herein may also be implemented in various other lighting fixtures, such as, for example, in the waveguide-based troffers disclosed in U.S. Patent Publication No. 2014/0347885, in the troffer style fixtures disclosed in U.S. Patent Publication No. 2012/0051041 and/or in the waveguide-based garage lights disclosed in U.S. Patent Publication No. 2014/0355302, each of which is hereby incorporated by reference. Other and similar light fixtures can be implemented using the above-described circuitry.

As known to those skilled in the art, lamps have been developed utilizing solid state light sources, such as LEDs, in combination with a phosphor or wavelength conversion material that is separate from or remote to the LEDs. Such arrangements are disclosed in U.S. Pat. No. 6,350,041, entitled "High Output Radial Dispersing Lamp Using a Solid State Light Source," which is hereby incorporated by reference. Suitable lamps can comprise a solid-state light source that transmits light through a separator to a disperser including one or more phosphors and/or the coated phosphor particles 100. The disperser can disperse the light in a desired pattern and/or changes its color by converting at least some of the light to a different wavelength through the phosphor(s), coated phosphor particles 100, and/or other wavelength conversion material. In some embodiments, the separator spaces the light source a sufficient distance from the disperser such that heat from the light source will not transfer to the disperser when the light source is carrying elevated currents necessary for room illumination. Additional remote phosphor techniques are described in U.S. Pat. No. 7,614,759, entitled "Lighting Device," which is hereby incorporated by reference.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A coated phosphor particle comprising:
a luminescent particle having a first refractive index at a predetermined wavelength, the predetermined wavelength being a dominant wavelength of a light emitting diode (LED) chip, the dominant wavelength being in a range from about 390 nm to about 560 nm;
an optical coating on the luminescent particle, the optical coating having a second refractive index at the predetermined wavelength;
wherein the second refractive index is between the first refractive index and a refractive index of an encapsulant at the predetermined wavelength,
wherein the optical coating is one of a plurality of optical coatings on the luminescent particle, each of the optical coatings having a second refractive index between the first refractive index and the refractive index of the encapsulant, the second refractive index decreasing through a thickness of the optical coatings in a direction away from the luminescent particle, each optical coating of the plurality comprising a successively lower second refractive index in the direction away from the luminescent particle.

2. The coated phosphor particle of claim 1, wherein the predetermined wavelength is a dominant wavelength of a light emitting diode (LED) chip.

3. The coated phosphor particle of claim 2, wherein the dominant wavelength is in a range from about 390 nm to about 560 nm.

4. The coated phosphor particle of claim 1, wherein the encapsulant comprises silicone.

5. The coated phosphor particle of claim 1, wherein the luminescent particle includes a host lattice comprising yttrium aluminum garnet (YAG), lutetium aluminum garnet (LuAG), or $CaAlSiN_3$.

6. The coated phosphor particle of claim 1,
wherein the refractive index of the encapsulant is in a range from 1.4 to less than 1.6,
wherein the first refractive index is in a range from greater than 1.8 to 1.9, and
wherein the second refractive index is in a range from 1.6 to 1.8.

7. The coated phosphor particle of claim 1, wherein the optical coating comprises a glass.

8. The coated phosphor particle of claim 1, wherein the optical coating comprises one or more oxides selected from the group consisting of: $M_2O$, where M is Li, Na, K, Rb, Cs, and/or Fr; NO, where N is Be, Mg, Ca, Sr, Ba, and/or Ra; $L_2O_3$, where L is La, Ce, Pr, Nd, Pm, Sm, Eu, Gd, Tb, Dy, Ho, Er, Tm, Yb and/or Lu; $B_2O_3$, $SiO_2$, $Al_2O_3$, BaO, $TiO_2$, ZnO, $ZrO_2$, $CeO_2$, EuO, PbO; and YbO.

9. The coated phosphor particle of claim 1, wherein the second refractive index varies through a thickness of the optical coating, the second refractive index comprising a gradient.

10. The coated phosphor particle of claim 1, wherein the optical coating is one of a plurality of optical coatings on the luminescent particle, wherein each of the optical coatings has a second refractive index between the first refractive index and the refractive index of the encapsulant, and wherein some or all of the optical coatings have different second refractive indexes.

11. The coated phosphor particle of claim 10, wherein the plurality of optical coatings includes at least two and up to 15 of the optical coatings.

\* \* \* \* \*